(12) United States Patent
Denis et al.

(10) Patent No.: US 8,550,391 B2
(45) Date of Patent: Oct. 8, 2013

(54) BRUSH CUTTER

(76) Inventors: Laurent Denis, Roxton Falls (CA);
Gilles Denis, Phillipsburg (CA)

( * ) Notice: Subject to any disclaimer, the term of this patent is extended or adjusted under 35 U.S.C. 154(b) by 384 days.

(21) Appl. No.: 12/924,862

(22) Filed: Oct. 8, 2010

(65) Prior Publication Data
US 2012/0018560 A1   Jan. 26, 2012

Related U.S. Application Data

(60) Provisional application No. 61/344,453, filed on Jul. 26, 2010.

(51) Int. Cl.
*B02C 18/18* (2006.01)

(52) U.S. Cl.
USPC ......................................................... 241/294

(58) Field of Classification Search
USPC ............................ 241/294, 101.763, 101.742
See application file for complete search history.

(56) References Cited

U.S. PATENT DOCUMENTS

| | | |
|---|---|---|
| 4,077,450 A | 3/1978 | Ackerman |
| 4,785,860 A | 11/1988 | Arasmith |
| 5,100,070 A | 3/1992 | Montgomery, Sr. |
| 5,103,882 A | 4/1992 | Milbourn |
| 5,146,963 A | 9/1992 | Carpenter et al. |
| 5,348,065 A | 9/1994 | Meyer |
| 6,237,865 B1 | 5/2001 | Luttermann et al. |
| 6,764,035 B2 | 7/2004 | Denis |
| 7,281,676 B1 | 10/2007 | Bennington |
| 7,810,531 B2 | 10/2010 | Labbé |
| 7,967,044 B2 | 6/2011 | Labbe et al. |
| 7,980,278 B2 | 7/2011 | Labbe et al. |
| 2007/0261763 A1 | 11/2007 | Labbe |
| 2009/0008488 A1 | 1/2009 | Willibald |
| 2011/0209797 A1 | 9/2011 | Labbé |

FOREIGN PATENT DOCUMENTS

CA     2597973     8/2007

*Primary Examiner* — Mark Rosenbaum
(74) *Attorney, Agent, or Firm* — Norton Rose Fulbright Canada

(57) ABSTRACT

A cutting tooth having a blade-like cutting section and a mounting section extending down from the bottom of the cutting section. The mounting section is narrower and shorter than the cutting section, and generally centered with respect to the cutting section. The mounting section has laterally extending flanges spaced from the cutting section. At least a quarter of the cutting section extends past the front of the mounting section and terminating in a cutting edge.

The cutting tooth is adapted to be mounted in a mounting block to form a cutting assembly. The mounting block has a slot extending into the block from the front face, the slot open in the top surface of the block. The mounting section of the tooth slides into the slot in the block to locate the cutting section on the top of the block with the cutting section projecting forwardly of the block. The flanges on the tooth hold the tooth in place in the block against centrifugal forces. The cutting assembly is adapted to be mounted between two collars on a brush cutting drum with the cutting tooth above the periphery of the collars.

13 Claims, 4 Drawing Sheets

BRUSH CUTTER

CROSS-REFERENCE TO RELATED APPLICATIONS

This application claims priority on provisional U.S. application No. 61/344,453 filed Jul. 26, 2010, the entire content of which is incorporated by reference herein.

BACKGROUND OF THE INVENTION

1. Technical Field

This invention relates to a cutting tooth for a brush cutter. The invention further relates to a cutting assembly for a brush cutter. The invention also relates to a brush cutter incorporating the cutting assembly.

2. Background Art

Brush cutters employing a cylindrical, rotatable, drum with cutting assemblies mounted on the drum, the drum mounted on the front of a vehicle or on a boom on a vehicle, are known. The cutting assemblies each generally comprise a mounting block fixed on the drum with a cutting tooth detachably mounted on the block. Since the mounting blocks and the teeth thereon are exposed on the surface of the drum, the brush cutters require frequent maintenance both in replacing damaged elements of the cutting assemblies, and in keeping the cutting teeth sharp.

Brush cutters are known which employ a cylindrical rotatable drum with annular, spaced-apart, protective collars mounted on the drum, and with a cutting assembly mounted partly within the peripheral edge of each collar so that at least part of the assembly is protected. However the assemblies extend laterally from the collars and the tooth assemblies often make initial contact with the unsupported, lateral, sections of the assemblies during cutting resulting in frequent damage to the assemblies and/or collars.

Brush cutters are also known which employ a cylindrical rotatable drum with annular, spaced-apart, protective collars mounted on the drum and with cutting assemblies mounted between adjacent collars on the drum. The cutting assemblies have a tooth mounted on the front of a mounting block, the block fastened to the drum and the collars and normally below the peripheral edge of the collars. The tooth extends up from the front of the block and is angled forwardly above the collars. The mounting blocks are well protected between and below the outer edge of the collars. The teeth however, extend above the collars and are bent to extend upwardly and forwardly. If the teeth extend too far upwardly above the collars and mounting blocks, the teeth are subject to large bending forces resulting in early failure of the teeth. If the teeth do not extend too far above the collars and mounting block, the teeth have a small bite when cutting brush and thus are not very efficient.

SUMMARY OF THE INVENTION

It is the purpose of the present invention to provide an improved cutting tooth for a brush cutter which tooth, when mounted on the brush cutter, will: increase the life of the tooth, allow for easier tooth installation and replacement, increase the efficiency of the brush cutter, and reduce maintenance. It is a further purpose of the present invention to provide a cutting assembly for a brush cutter, incorporating the improved cutting tooth in a mounting block, which assembly will easily yet securely mount the tooth while locating it in an efficient cutting position. It is a further purpose of the present invention to provide a brush cutter incorporating the tooth and the cutting assembly in a manner to allow efficient cutting with the tooth able to take larger 'bites' of the brush than normal making the machine more efficient. It is another purpose to have the brush cutter position the teeth for easy replacement and mounting and for easy sharpening. It is a further purpose to have the brush cutter position the teeth in a manner to have the cutting section of the tooth approaching a tangential position relative to the peripheral edge of the collars so that the cutting edge tends to retain its radial distance from the center of rotation of the edge even after numerous sharpenings which shorten the tooth.

In accordance with the present invention, a cutting tooth is provided having a blade-like cutting section integral with a mounting section on the tooth. The cutting section is spaced from the mounting section by a connector section and extends forwardly of the mounting and connecting sections to terminate in a cutting edge. The cutting tooth is mounted on a mounting block to form a cutting assembly for a brush cutter. The mounting block is a parallelpiped adapted for mounting between adjacent protective collars on a brush cutter drum. The block is mounted at the peripheral edge of the collars above the surface of the drum. The cutting tooth and mounting block are designed to have the cutting tooth quickly and easily, yet extremely securely, mounted in the mounting block. The manner of mounting of the tooth on the block makes replacement quick and simple. The cutting tooth is mounted to have the cutting section above the mounting block with the cutting section extending forwardly of the mounting block. With the assembly mounted on the protective collars, the cutting section of the tooth, located above the collars, allows the tooth to engage and cut more of the brush on each rotation making it more efficient. The tooth is mounted to have the cutting section generally tangentially located with respect to the cutting circle described by the cutting edge of the tooth during operation. Cutting and impact forces are thus transmitted mainly in compression against the cutting section. The tangential and extended position of the cutting section on and from the mounting block increases the ability of the cutter to grasp more brush thus increasing efficiency. It also positions the cutting edge in a more exposed position making sharpening easier. The tangential position also ensures that the cutting edge remains in generally the same radial location after sharpening thus minimizing any reduction in efficiency due to shortening of the blade. The tooth is preferably spaced radially outwardly from the periphery of the collars at least about a distance equal to half the thickness of the tooth. The cutting section of the tooth is further sized and positioned to have the cutting edge at least about a third of the length of the cutting section in front of the mounting block.

The invention is particularly directed toward a cutting tooth having a blade-like cutting section, a mounting section extending down from the bottom of the cutting section, the mounting section narrower and shorter than the cutting section, and generally centered with respect to the cutting section, the mounting section having laterally extending retaining means spaced from the cutting section, at least a quarter of the cutting section extending past the front of the mounting section and terminating in a cutting edge.

The invention is further directed toward 11. A cutting assembly having: a mounting block for attachment to a brush cutting drum, the block having a front surface and a top surface, a slot extending into the block rearwardly from the front face, the slot open in the top surface, the slot having a laterally enlarged area spaced from the top surface; a cutting tooth having a plate-like top cutting section, a mounting section extending down from the bottom of the cutting section, the mounting section narrower and shorter than the cutting section, and generally centered with respect to the cutting section, the mounting section having laterally extending retaining means spaced from the cutting section, the tooth connectable to the mounting block by sliding the mounting section snugly into the slot in the block with the cutting section resting snugly on the top of the block and the retaining means, in the laterally enlarged area, preventing the tooth from moving up through the slot, the cutting section, when the tooth is mounted on the block, having at least a quarter of its length extending forwardly from the front of the block and terminating in a cutting edge.

DETAILED DESCRIPTION OF THE INVENTION

Figure 1:
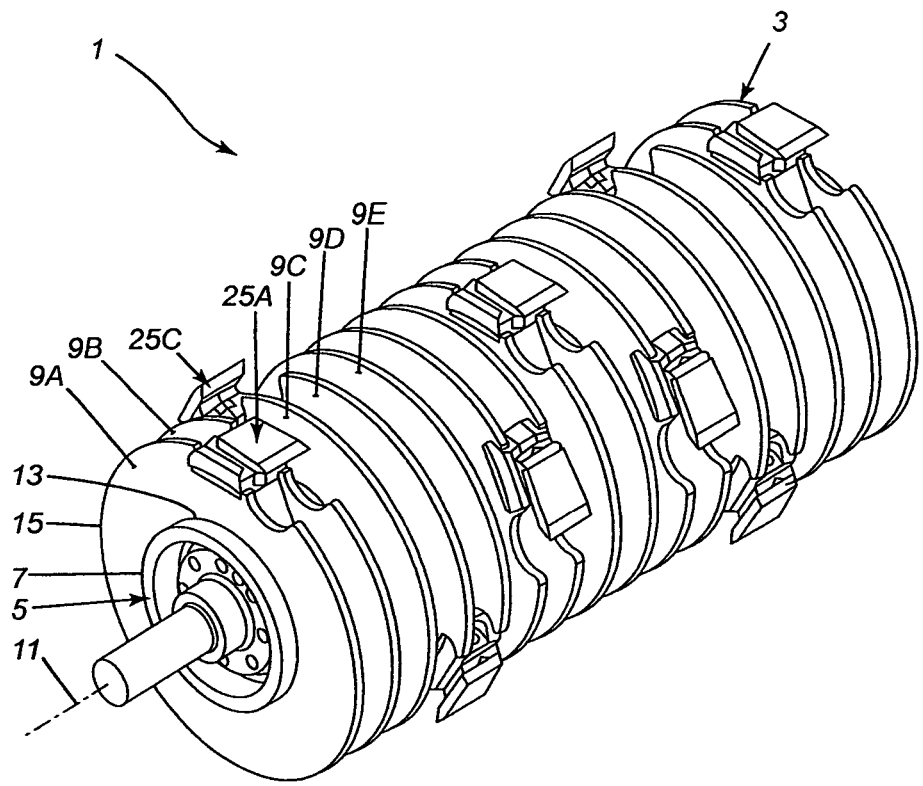
FIG. 1 is a perspective view of the brush cutter.
Figure 2:
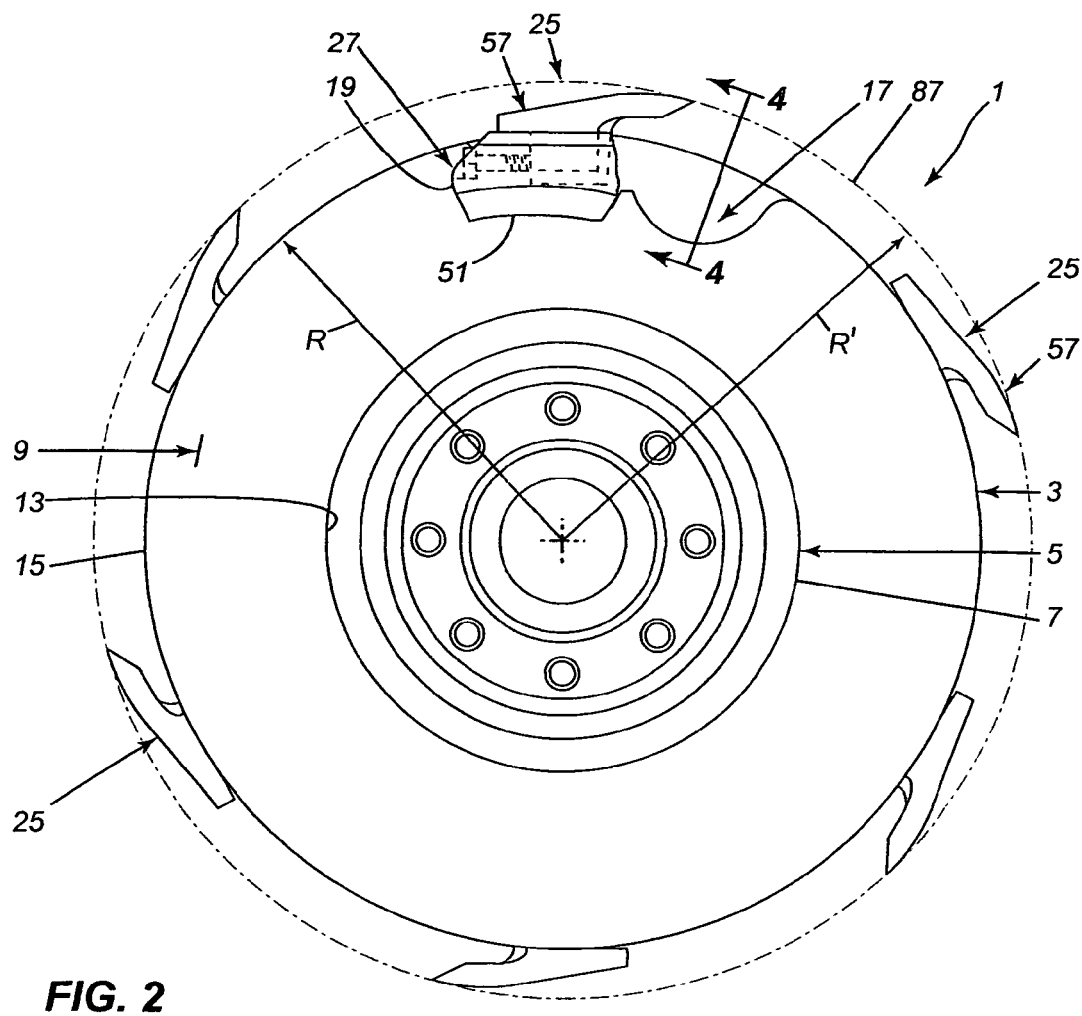
FIG. 2 is an end view of the brush cutter.
Figure 3:
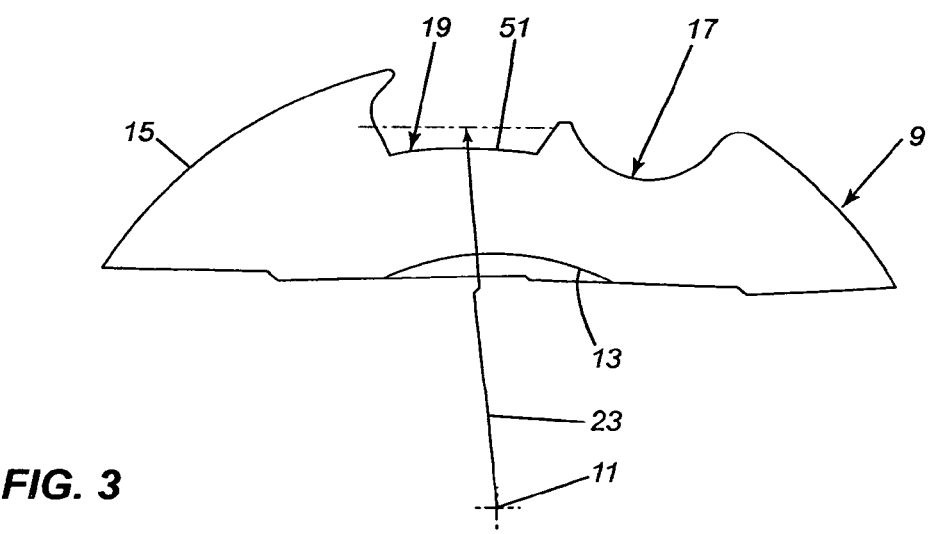
FIG. 3 is a detail side view of a collar.

The brush cutter 1 of the present invention, as shown in FIGS. 1 to 3, has a rotatable drum 3. The drum 3 includes a central, tubular member 5 having a cylindrical surface 7. Annular collars 9 are mounted on the tubular member 5, the collars of equal size and equally spaced-apart and transverse to the longitudinal, central axis 11 of the tubular member 5. Each collar 9 has an inner circular periphery 13, sized to just receive the member 5 there through, and an outer periphery 15. The outer periphery 15 is also preferably circular but it could also have helical sections. Each collar 9 is welded onto the surface 7 of the tubular member 5. The drum 3 is mounted at its ends in any well known manner in a frame (not shown) that carries the drum and the drum is rotatable in the frame about its axis 11 by suitable drive means, (not shown).

Each collar 9 has at least one first cutout 17 extending radially inwardly from the outer periphery 15 of the collar. The cutout 17 has a generally semi-circular shape and extends nearly halfway into the collar. A second cutout 19 is located behind and adjacent to each first cutout 17 in each collar 9, the second cutout 19 intercepting the rear of the first cutout 17 and having a roughly rectangular shape. The second cutout 19 is generally transverse to a radial line 23, extending from the axis 11 of rotation of the drum, the radial line 23 bisecting the cutout 19. The first cutout 17 helps in chip dispersal during operation of the brush cutter. The second cutout 19 is used to mount a cutting assembly 25 on adjacent collars as will be described.

Each pair of adjacent collars 9 supports at least one cutting assembly 25 between them. Each cutting assembly 25 is mounted in the second cutouts 19 of the adjacent collars, which cutouts are aligned, as will be described. Thus, as shown in FIG. 1, adjacent collars 9A-9B support a cutting assembly 25A between them. Next adjacent collars 9B-9C support a cutting assembly 25B between them. Next adjacent collars 9C-9D support a cutting assembly 25C between them. Each pair of adjacent collars supports at least one cutting assembly. Each cutting assembly is angularly displaced relative to the immediately adjacent cutting assemblies. The amount of angular displacement can vary.

Figure 4:
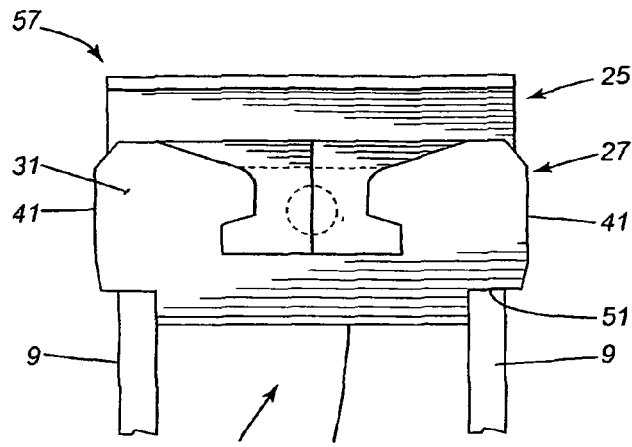
FIG. 4 is a cross-section view taken along line 4-4 in FIG. 2 showing a cutting assembly mounted on two adjacent collars of the brush cutter.
Figure 6:
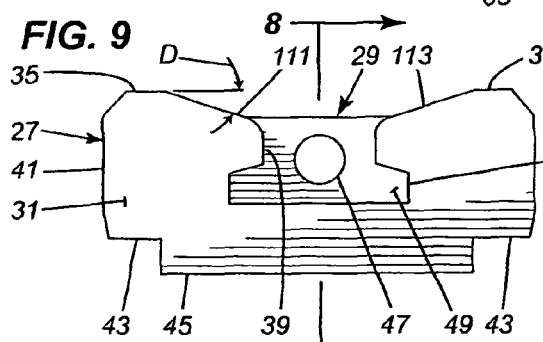
FIG. 6 is a front view of the mounting block.
Figure 7:
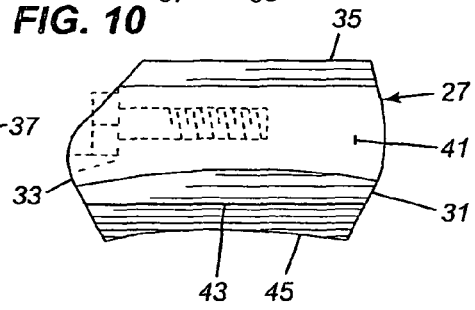
FIG. 7 is a side view of a mounting block.
Figure 8:
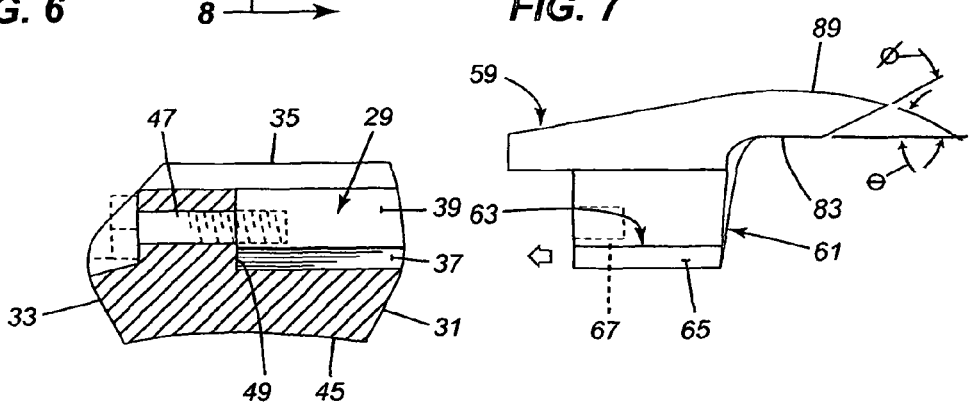
FIG. 8 is a cross-section view of the mounting block taken along line 8-8 in FIG. 6.
Figure 5:
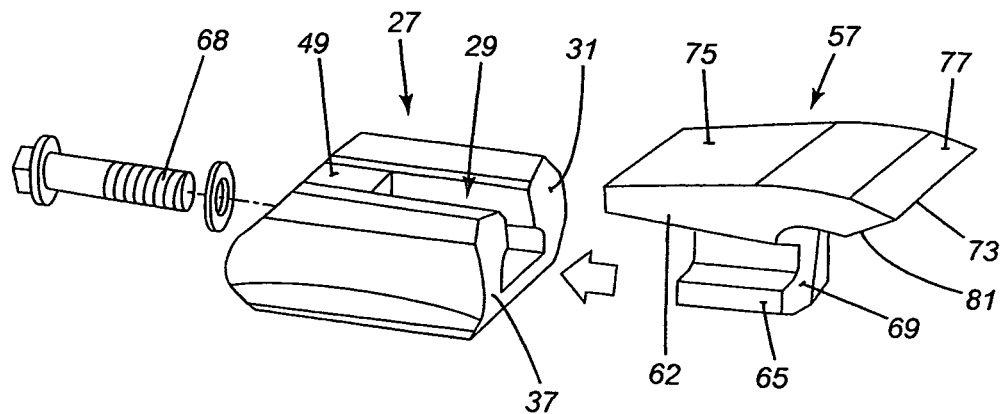
FIG. 5 is a perspective exploded view of the cutting assembly.

Each cutting assembly 25 includes a mounting block 27 having a generally parallelpiped shape as shown in FIGS. 4 and 5. The length of the block 27 is about the same as its width and the block can have a thickness about half its length. The block 27, as shown in FIGS. 6-8 has a slot 29 extending rearwardly from the front surface 31 of the block. The front surface 31 of the block is the end of the block facing the direction of rotation of the block when the brush cutter operates. The slot 29 extends more than halfway into the block, towards the trailing end 33 of the block. The slot 29 opens in the top surface 35 of the block. The slot 29 has retaining means 36 for helping retain a cutting tooth in the slot. The retaining means 36 can comprise a wider portion 37 in the slot than the remainder 39 of the slot. The wider portion 37 preferably is at the bottom of the slot 29. The slot 29 is shaped to hold a tooth in the slot against centrifugal forces during rotation of the drum. The slot 29 shown has an inverted 'T' shape but other shapes achieving the same result as the 'T' slot can be used. The sides 41 of the block 27 are undercut at their bottoms to form shoulders 43 just above the bottom 45 of the block. A threaded hole 47 extends through the trailing end 33 of the block through an end wall 49 opening into the slot 29.

The mounting block 27 is adapted to be mounted between two adjacent collars 9, having the shoulders 43 resting on the bottom edge 51 of the second cutouts 19 as shown in FIGS. 2 and 4. The block 27 is welded to the collars 9 about the cutouts 19 with the block being welded to the two collars 9 at the shoulders 43 and at part of its leading and trailing ends 31, 33. When welded, the top 35 of the block 27 is generally aligned with the outer peripheries 15 of the collars 9 as shown in FIG. 2. When attached to the collars, the block 27 is spaced from surface 7 of the tubular member 5 forming a chip dispersal gap 53 between the block 27 and the tubular member 5.

Figure 9:
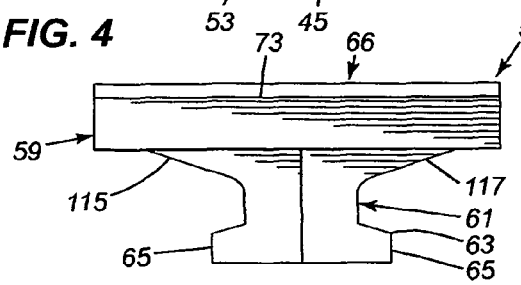
FIG. 9 is a front view of a cutting tooth.
Figure 10:
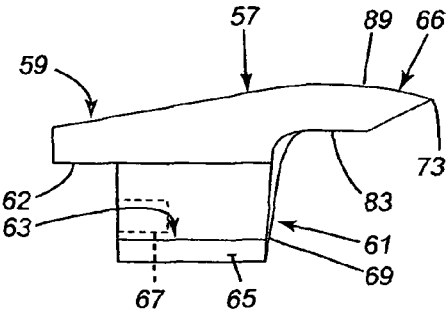
FIG. 10 is a side view of the cutting tooth.

The cutting assembly 25 includes a cutting tooth 57. The cutting tooth 57, as shown in FIGS. 9 and 10, has a blade-like cutting section 59 at the top, and a mounting section 61 extending down from the bottom 62 of the cutting section 59. The mounting section 61 is narrower and shorter than the cutting section 59 and centrally located with respect to it. The mounting section 61 has lateral retaining means 63 spaced from the cutting section 59. The retaining means 63 can be in the form of flanges 65 at the bottom of the mounting section 61 extending laterally from its sides. The mounting section 61 fits snugly in the slot 29 with the flanges 65 fitting in the bottom section 37 of the slot. The cutting section 59 rests snugly on the top 35 of the mounting block 27 with a cutting portion 66 projecting forwardly of the block. When the tooth 57 is mounted in the block 27, a threaded hole 67 in the rear of the connecting section 63 is aligned with, and adjacent, the threaded hole 47 in the end wall 49 of the block 27. A bolt 68 connects the tooth 57 to the block 27.

The cutting section 59 has a generally flat blade shape, is about as wide as it is long, and is generally straight. The cutting section 59 is relatively thick, about a half inch, but its thickness can range between about three sixteenths of an inch and five eighths of an inch. The front of the cutting portion 66 is bevelled to form a cutting edge 73. Preferably the top surface 75 is bevelled slightly at the front of the cutting section as shown by bevel surface 77. Bevel surface 77 is angled down from the top surface 75 by an angle θ of 8-10°. This angle provides clearance for the cutting section when cutting to minimize drag. The cutting section 59 is also bevelled up from the bottom surface 62 by a bevel surface 81. The bevel surface 81 extends upwardly at an angle ø between 45-50°. The bevel surfaces 77, 81 meet about a third of the way down from the top surface 75 to form the cutting edge 73.

At least about a quarter and preferably about a third of the cutting section 59 extends past the front of the block 27 connecting section 63. Preferably the projecting portion 66 of the cutting section 59 thickens slightly from the rear to the front and is undercut at the front as shown at 83. The thickening raises the cutting edge 73 well above the collars 9 and the undercutting provides greater access to the cutouts 17, 19. The tooth 57 is positioned and sized to have the cutting edge 73 follow a circular path 87 that has a radius R1 one half to one inch longer than the outer radius R of the collars 9 as shown in FIG. 2.

The cutting section 59 of the tooth 57 is shown and described as being relatively straight but it can be curved down slightly at the front, as shown at 89 to minimize drag during cutting. The cutting section 59 can also be curved slightly transverse to its length if desired. The cutting section 59 is made long enough to ensure that it is securely attached to the mounting section 61 and yet long enough to project past the block 27 for at least a quarter of its length. Having the cutting section 59 above the block 27 and the collars, and extending forwardly generally tangentially from the block allows the brush cutter to have a deeper bite when rotating and also allows it to better gather brush to be cut. Having the tooth extending generally tangentially and forwardly of the block also allows it to be sharpened many times without greatly changing its depth of bite so it retains its efficiency. The cutting edge 73 does not move too far inwardly from the original cutting circle 87 as the tooth shortens when sharpened. The tooth is also generally aligned with the cutting force exerted on the tooth, the tooth taking the cutting force primarily in compression. The arrangement is also protective of the mounting block while locating the tooth in an efficient cutting position.

Figure 11:
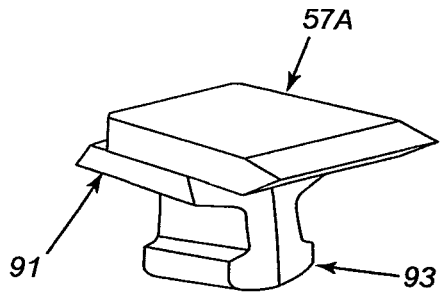
FIG. 11 is a perspective view of a modified cutting assembly.
Figure 13:
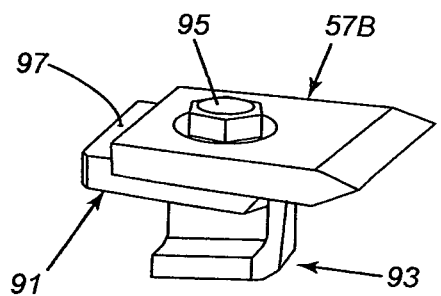
FIG. 13 is a perspective view of another modified cutting assembly.
Figure 12:
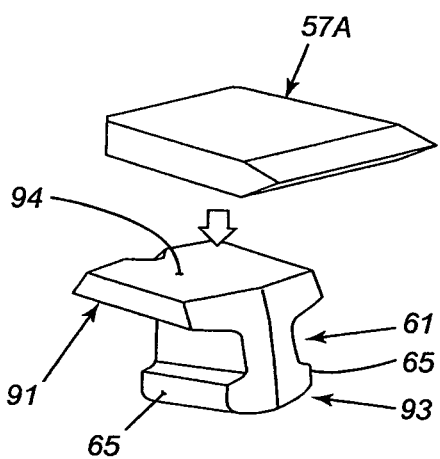
FIG. 12 is a perspective exploded view of the assembly shown in FIG. 11.
Figure 14:
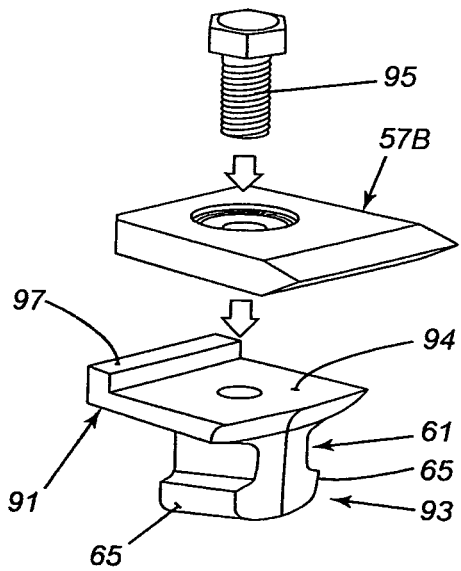
FIG. 14 is a perspective exploded view of the assemnly shown in FIG. 13.

The tooth 59 described is preferably integrally forged or cast as a single unit. Alternatively, the cutting section can be separately formed from the mounting section. In one embodiment, shown in FIGS. 11 and 12, a platform section 91 is provided on the top of the mounting section 61 to receive the cutting section 57A. The platform and mounting sections 91, 61 form an integral unit 93 which can be forged or cast. The cutting section 57A in this embodiment can be slightly thinner and can be welded onto the flat top 93 of the platform section 91. In another embodiment, shown in FIGS. 13 and 14 the cutting section 57B can be bolted onto the flat top 93 of the platform section 91 with a bolt 95. The platform section 91 could have a shoulder 97 at its end against which the cutting section 57B abuts. In both embodiments using a platform section the cutting tooth is more plate-like than the forged cutting tooth. The platform not only serves to mount the tooth on the block but also serves to raise the cutting edge of the tooth relative to the collars to provide more efficient operation.

Figure 15:
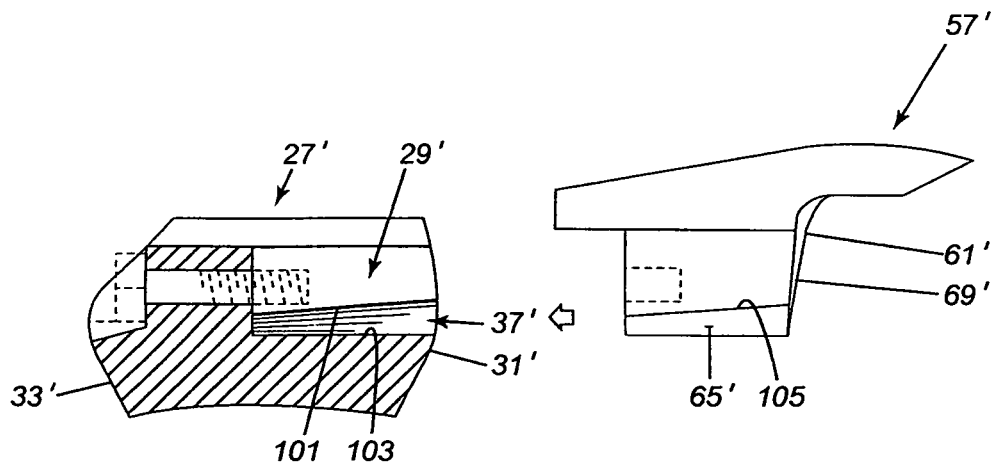
FIG. 15 is a view similar to FIG. 8 with a modification to the mounting block and cutting tooth.

To improve stability for the tooth, the bottom section 37' of the slot 29' in the mounting block 27' can taper slightly from the leading end 31' of the block, narrowing toward the trailing end 33' as shown in FIG. 15. More specifically, the upper surfaces 101 of the bottom section 37' tapers toward the bottom surface 103 in moving toward the trailing end 33'. The bottom flanges 65' on the mounting section 61' of the tooth 57' are also tapered from its leading end 69' toward its trailing end 67'. More specifically, the upper surfaces 105 of the flanges 65' are tapered to the same degree that the tapered surfaces 101 on the lower section of the mounting block 27' are tapered. As a result, the tooth, as its mounting section 61' nears complete entry into the slot 29' in the block 27', wedges tightly into the block between slot portion 37' and the upper surface 35' of the block. Impact forces generated during cutting only serve to more tightly wedge the tooth to the block.

To further improve stability of the tooth during cutting, the upper surfaces 111, 113 of the mounting block 27 can be beveled inwardly toward the slot 29 at a small angle 'D' of about fifteen degrees as shown in FIG. 6. The upper portion of the mounting section 61 can have its sides flare outwardly before joining the cutting section 59 near the sides of the cutting section. The flared sides form bottom surfaces 115, 117 that are angled outwardly and upwardly on each side away from the slot at an angle to match the angle of the bevel of the surfaces 111, 113. The bottom surfaces 115, 117 of the connecting member 57 will sit flush on the bevelled upper surfaces 111, 113 of the block 27 minimizing side-to-side rocking of the connecting member 57 and the attached tooth 57 to either side during cutting. The surfaces 111, 113 can instead be formed on the bottom of the platform 91 if a platform is used in place of a forged tooth.

We claim:

1. A cutting assembly comprising:
a mounting block for attachment to a brush cutting rotary element, the block having a front surface and a top surface, a slot extending into the block rearwardly from the front surface along only part of a length of the block, the slot being open in the top surface, the slot having a cross-section including a laterally enlarged area spaced from the top surface; and
a cutting tooth having a top cutting section with opposed front and rear ends defining a length therebetween, a mounting section extending down from a bottom surface of the cutting section, the mounting section having a retaining portion spaced from the cutting section with a cross-section complementary to that of the slot, the tooth connectable to the mounting block by sliding the retaining portion snugly into the slot in the block with a remainder of the tooth resting snugly on the top surface of the block, the retaining portion of the mounting section engaged in the laterally enlarged area preventing the tooth from moving up through the slot, the cutting section, when the tooth is mounted on the block, having at least a quarter of its length extending forwardly from the front of the block with the front end terminating in a cutting edge.

2. The cutting assembly as claimed in claim 1, wherein the top surface of the block is angled to slope slightly upwardly in both directions toward the sides of the block from the slot, the remainder of the tooth defining complementary sloping surfaces to sit flush against the angled top surfaces of the block.

3. The cutting assembly as claimed in claim 1, wherein the retaining portion comprises a pair of symmetrical bottom flanges, one of the flanges extending from each side of the mounting section.

4. The cutting assembly as claimed in claim 3, wherein a top surface of each flange angles slightly downwardly from the front surface to a back of the mounting section, a top surface of the laterally enlarged area of the slot being complementarily angled to engage the top surface of the flanges to wedge the flanges in the slot.

5. The cutting assembly as claimed in claim 1, wherein the cutting section and mounting section are separate members, the cutting section being connected to the mounting section through a top platform section, the top platform section being an integral part of the mounting section and having an increased width with respect to an adjacent part of the mounting section, the platform section resting on the top surface of the block.

6. The cutting assembly as claimed in claim 1, wherein the cutting section and mounting section are formed of a unitary piece.

7. The cutting assembly as claimed in claim 1, further comprising a threaded fastener threadingly engaged to the block and extending through a rear surface of the block and within the slot to threadingly engage the mounting section of the tooth.

8. A brush cutter comprising:
   a rotatable drum, the drum having a central tubular member with a cylindrical surface, a plurality of collars mounted on the cylindrical surface of the member, the collars being spaced-apart along a longitudinal axis of the member and extending transverse to the longitudinal axis of the member, each collar having a cutout extending inwardly from a peripheral edge of the collar; and
   at least one cutting assembly mounted on each adjacent pair of collars, the pair of collars having their cutouts aligned, each cutting assembly having:
      a mounting block mounted between, and to, the two collars on edges defining the cutouts, the block having a front surface and a top surface, the block having a slot extending rearwardly from the front surface along only part of a length of the block, the slot opening up in the top surface with a wider section of the slot being defined away from the top surface, and
      a cutting tooth having a top blade-like cutting section with opposed front and rear ends defining a length therebetween, a mounting section extending down from the cutting section and defining a retaining portion spaced from the cutting section and having a shape complementary to that of the slot, the cutting tooth detachably mounted on the block with the retaining portion slidable snugly into the slot in the block with a remainder of the tooth resting snugly on the top surface of the block, the cutting section extending at least substantially along a tangential direction of the collars and located at least partly radially outwardly of the peripheral edges of the collars, the mounting section extending for at least a quarter of the length thereof in front of the block, the front end of the cutting section terminating in a cutting edge.

9. The brush cutter as claimed in claim 8 wherein the slot and retaining portion have an inverted T-shaped cross section.

10. The brush cutter as claimed in claim 8 wherein complementary top surfaces of the slot and retaining portion of the mounting section angle slightly downwardly from the front surface toward a rear of the block relative to the top surface thereof such as to allow the retaining portion to be wedged tightly into the slot.

11. A cutting assembly for a brush cutter having:
   a mounting block for attachment to a brush cutting rotary element, the block having a slot extending into the block from a front surface thereof, the slot open on a top surface of the block;
   a cutting tooth having a cutting section, a mounting section extending down from a bottom of the cutting section, the cutting tooth mounted on the block by inserting at least a portion of the mounting section in the slot from the front surface of the block with the cutting section adjacent the top surface of the block, the cutting section having opposed front and rear ends defining a length therebetween, and having at least a quarter of the length projecting forwardly of the block, the front end defining a cutting edge; and
   co-operating means on the tooth and the block for retaining the tooth in the slot.

12. The cutting assembly as claimed in claim 11, wherein the cutting section and mounting section are separate members, the cutting section being connected to the mounting section through a top platform section being an integral part of the mounting section and having an increased width with respect to an adjacent part of the mounting section, the platform section resting on the top surface of the block.

13. The cutting tooth assembly as claimed in claim 11, wherein the cutting section and mounting section are formed of a unitary piece.

* * * * *

UNITED STATES PATENT AND TRADEMARK OFFICE
CERTIFICATE OF CORRECTION

| | | |
|---|---|---|
| PATENT NO. | : 8,550,391 B2 | Page 1 of 1 |
| APPLICATION NO. | : 12/924862 | |
| DATED | : October 8, 2013 | |
| INVENTOR(S) | : Laurent Denis and Gilles Denis | |

It is certified that error appears in the above-identified patent and that said Letters Patent is hereby corrected as shown below:

In the Claims

Claim 8, column 8, line 7, should read:

8. A brush cutter comprising:
   a rotatable drum, the drum having a central tubular member with a cylindrical surface, a plurality of collars mounted on the cylindrical surface of the member, the collars being spaced–apart along a longitudinal axis of the member and extending transverse to the longitudinal axis of the member, each collar having a cutout extending inwardly from a peripheral edge of the collar; and
   at least one cutting assembly mounted on each adjacent pair of collars, the pair of collars having their cutouts aligned, each cutting assembly having:
   a mounting block mounted between, and to, the two collars on edges defining the cutouts, the block having a front surface and a top surface, the block having a slot extending rearwardly from the front surface along only part of a length of the block, the slot opening up in the top surface with a wider section of the slot being defined away from the top surface, and
   a cutting tooth having a top blade-like cutting section with opposed front and rear ends defining a length therebetween, a mounting section extending down from the cutting section and defining a retaining portion spaced from the cutting section and having a shape complementary to that of the slot, the cutting tooth detachably mounted on the block with the retaining portion slidable snugly into the slot in the block with a remainder of the tooth resting snugly on the top surface of the block, the cutting section extending at least substantially along a tangential direction of the collars and located at least partly radially outwardly of the peripheral edges of the collars, the cutting section extending for at least a quarter of the length thereof in front of the block, the front end of the cutting section terminating in a cutting edge.

Signed and Sealed this
Sixteenth Day of June, 2015

Michelle K. Lee
*Director of the United States Patent and Trademark Office*